(12) United States Patent
Tirupachur Comerica et al.

(10) Patent No.: US 8,806,580 B2
(45) Date of Patent: Aug. 12, 2014

(54) CLUSTERED AAA REDUNDANCY SUPPORT WITHIN A RADIUS SERVER

(75) Inventors: Subash Tirupachur Comerica, Sunnyvale, CA (US); Dhiraj D. Ballal, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 403 days.

(21) Appl. No.: 13/353,028

(22) Filed: Jan. 18, 2012

(65) Prior Publication Data

US 2013/0185767 A1    Jul. 18, 2013

(51) Int. Cl.
*G06F 7/04*        (2006.01)

(52) U.S. Cl.
USPC ............................................................ 726/4

(58) Field of Classification Search
USPC .......................... 726/3–5; 713/151, 152, 155
See application file for complete search history.

(56) References Cited

U.S. PATENT DOCUMENTS

| | | | | |
|---|---|---|---|---|
| 7,681,242 B2 * | 3/2010 | Green et al. | ..................... | 726/27 |
| 2008/0044181 A1 | 2/2008 | Sindhu | | |
| 2010/0088753 A1 * | 4/2010 | Ayres et al. | ....................... | 726/9 |
| 2010/0094978 A1 * | 4/2010 | Runeson et al. | ............... | 709/221 |
| 2011/0029628 A1 * | 2/2011 | Haffner | ......................... | 709/206 |
| 2011/0178926 A1 * | 7/2011 | Lindelsee et al. | ............... | 705/44 |

OTHER PUBLICATIONS

Rigney et al., "Remote Authentication Dial in User Service (RADIUS)," RFC 2865, Jun. 2000, 71 pp.
Rigney et al., "RADIUS Accounting," RFC 2866, Jun. 2000, 27 pp.
Chiba et al., "Dynamic Authorization Extensions to Remote Authentication Dial in User Service (RADIUS)," RFC 3576, Jul. 2003, 29 pp.
U.S. Appl. No. 13/248,825, entitled "High-Availability Mobile Gateways Having Interchassis Non-Uniform Service Unit Redundancy," filed Sep. 29, 2011.
U.S. Appl. No. 13/248,834, entitled "Mobile Gateway Having Reduced Forwarding State for Anchoring Mobile Subscribers," filed Sep. 29, 2011.
U.S. Appl. No. 12/182,619, entitled "Streamlined Packet Forwarding Using Dynamic Filters for Routing and Security in a Shared Forwarding Plane," filed Jul. 30, 2008.

* cited by examiner

*Primary Examiner* — Beemnet Dada
(74) *Attorney, Agent, or Firm* — Shumaker & Sieffert, P.A.

(57) ABSTRACT

In general, techniques are described for supporting interchassis redundancy (ICR) by a plurality of network access servers (NASes) that are members of an ICR. For example, techniques may be used to associate, within a RADIUS server, multiple NAS identifiers for the NASes with a single NAS identifier alias. The RADIUS server is configured to handle RADIUS protocol messages from any member of the ICR cluster as though the RADIUS protocol messages issued from a single NAS having the NAS identifier alias.

25 Claims, 7 Drawing Sheets

CLUSTERED AAA REDUNDANCY SUPPORT WITHIN A RADIUS SERVER

TECHNICAL FIELD

The invention relates to computer networks and, more specifically, to subscriber authentication, authorization, and accounting within computer networks.

BACKGROUND

Network service providers typically deploy one or more servers to manage authentication, authorization, and accounting (AAA) functionality for networks that over services to one or more subscribers. The protocol most commonly used by the servers to communicate with clients is the Remote Authentication Dial In User Service (RADIUS) protocol. The RADIUS protocol is described in Carl Rigney et al., "Remote Authentication Dial In User Server (RADIUS)," Network Working Group of the Internet Engineering Task Force (IETF), Request for Comments 2865, June 2000, which is incorporated by reference herein in its entirety (referred to hereinafter as "RFC 2865").

To request access to a service, a subscriber connects to a network access server (NAS) that acts as a gateway to the service as provided by a service provider network (or the Internet). If the NAS is a RADIUS client configured to communicate with a RADIUS server for the service provider network using the RADIUS protocol, the NAS confirms that the subscriber is authentic and is authorized to access the service by requesting the RADIUS server to validate the access request from the subscriber. Upon validating an access request, the RADIUS server responds to the NAS with a RADIUS protocol message directing the NAS to accept the access request and establish a session enabling connectivity between the subscriber and the service provider network for the requested service.

The NAS may thereafter monitor and record statistics describing service usage by the subscriber. If configured to use RADIUS accounting, the NAS periodically communicates the statistics to a RADIUS accounting server using the RADIUS protocol. RADIUS accounting is described in Carl Rigney, "RADIUS Accounting," Network Working Group of the IETF, Request for Comments 2866, June 2000, which is incorporated by reference herein in its entirety (referred to hereinafter as "RFC 2866").

SUMMARY

In general, techniques are described for supporting interchassis redundancy (ICR) by a plurality of network access servers (NASes) that are members of an ICR cluster. For example, techniques may be used to associate, within a RADIUS server, multiple NAS identifiers for the NASes with a single NAS identifier alias. The RADIUS server is configured to handle RADIUS protocol messages from any member of the ICR cluster as though the RADIUS protocol messages issued from a single NAS having the NAS identifier alias.

In one example, an administrator configures a RADIUS server to recognize NASes that are members of an ICR cluster as RADIUS clients. In addition, the administrator configures the RADIUS server to associate NAS identifiers for each of the NASes with a single NAS identifier alias for the group. The corresponding NAS identifier for each of the NASes may be a respective network address or a NAS-IDentifier value, either of which may uniquely identify the NAS within the RADIUS server domain. When an active one of the NASes for a subscriber establishes a session enabling connectivity between the subscriber and the service provider network for a requested service, the RADIUS server may receive session information relating to the connection in a RADIUS start accounting request from the NAS that includes the NAS identifier. The RADIUS server determines whether a NAS identifier alias is configured for the NAS identifier included in the RADIUS start accounting request and, if so, stores the session information to a session data structure that is uniquely identifiable within the RADIUS by a combination of the NAS identifier alias and an accounting session identifier also included in the RADIUS start accounting request. The RADIUS server handles subsequent requests or other messages associated with the session from any of the NASes that are members of the ICR cluster by similarly aliasing the NAS identifiers included in the messages to the NAS identifier alias configured for the ICR cluster.

In the event the active NAS for the session fails, a standby one of the clustered NASes for the session assumes responsibility for maintaining service connectivity for the session in accordance with interchassis redundancy techniques. In this case, the RADIUS server receives subsequent requests or other messages associated with the session from the newly-active NAS that has a NAS identifier that is distinct from the previous active NAS for the session. By aliasing the set of unique NAS identifiers for the clustered NASes to the common NAS identifier alias, the RADIUS server may use the combination of the NAS identifier alias and the accounting session identifier of the currently received request to look up the data structure for the session to access session information therein. That is, the RADIUS server maps the unique NAS identifier within the current request to the common NAS identifier alias, and uses the combination of the NAS identifier alias and any accounting session identifier as an index to select the appropriate data structure of session information for this particular session with the clustered NASes. In this way, the RADIUS server may avoid creating a new session data structure keyed to a combination of the NAS identifier for the newly-active NAS and the accounting session identifier and instead maintain continuity for the session.

The techniques may provide one or more advantages. For example, whereas en t-side aliasing each of the NASes to a single network address may require configuring multiple different boxes and executing a process, such as Virtual Router Redundancy Protocol (VRRP), on each of the NASes to cluster the NASes as a single network address for network communication with the RADIUS server, aliasing the NASes of an ICR cluster according to the described techniques may be accomplished by configuring only the RADIUS server. In addition, unlike client-side aliasing as described above, the techniques of this disclosure may in some examples enable tunneling between the RADIUS server and any of the NASes of an ICR group. Still further, the techniques may enable the RADIUS server to associate all subscribers that attach to any NASes of the ICR cluster with a single interface (the NAS identifier alias) white maintaining conformity to the RADIUS protocol described in RFC 2865.

In one example, a method comprises storing, with a Remote Authentication Dial-In User Service (RADIUS) server for a service provider network, aliasing information that associates a plurality of redundant network access servers with a common network access server identifier alias. The method also comprises receiving, with the RADIUS server, a RADIUS protocol request message from a first network access server of the plurality of redundant network access servers for a session that enables connectivity between a subscriber and the service provider network. The method further comprises associating, with the RADIUS server, the RADIUS protocol request message with the network access server identifier alias based at least on the aliasing information. The method also comprises accessing, with the RADIUS server, a session record for the session using the network access server identifier alias.

In another example, a server that provides authentication, authorization, and accounting services for a service provider network comprises a control unit having one or more processors. An alias table of the control unit stores aliasing information that associates a plurality of redundant network access servers with a common network access server identifier alias. A network interface of the control unit receives a Remote Authentication Dial-In User Service (RADIUS) protocol request message from a first network access server of the plurality of redundant network access servers for a session that enables connectivity between a subscriber and the service provider network. An alias module of the control unit associates the RADIUS protocol request message with the network access server identifier alias based at least on the aliasing information, wherein the control unit accesses a session record for the session using the network access server identifier alias.

In another example, a non-transitory computer-readable medium contains instructions. The instructions cause one or more programmable processors to store, with a Remote Authentication Dial-In User Service (RADIUS) server for a service provider network, aliasing information that associates a plurality of redundant network access servers with a common network access server identifier alias. The instructions also cause the programmable processors to receive, with the RADIUS server, a RADIUS protocol request message from a first network access server of the plurality of redundant network access servers for a session that enables connectivity between a subscriber and the service provider network. The instructions also cause the programmable processors to associate, with the RADIUS server, the RADIUS protocol request message with the network access server identifier alias based at least on the aliasing information. The instructions also cause the programmable processors to access, with the RADIUS server, a session record for the session using the network access server identifier alias.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
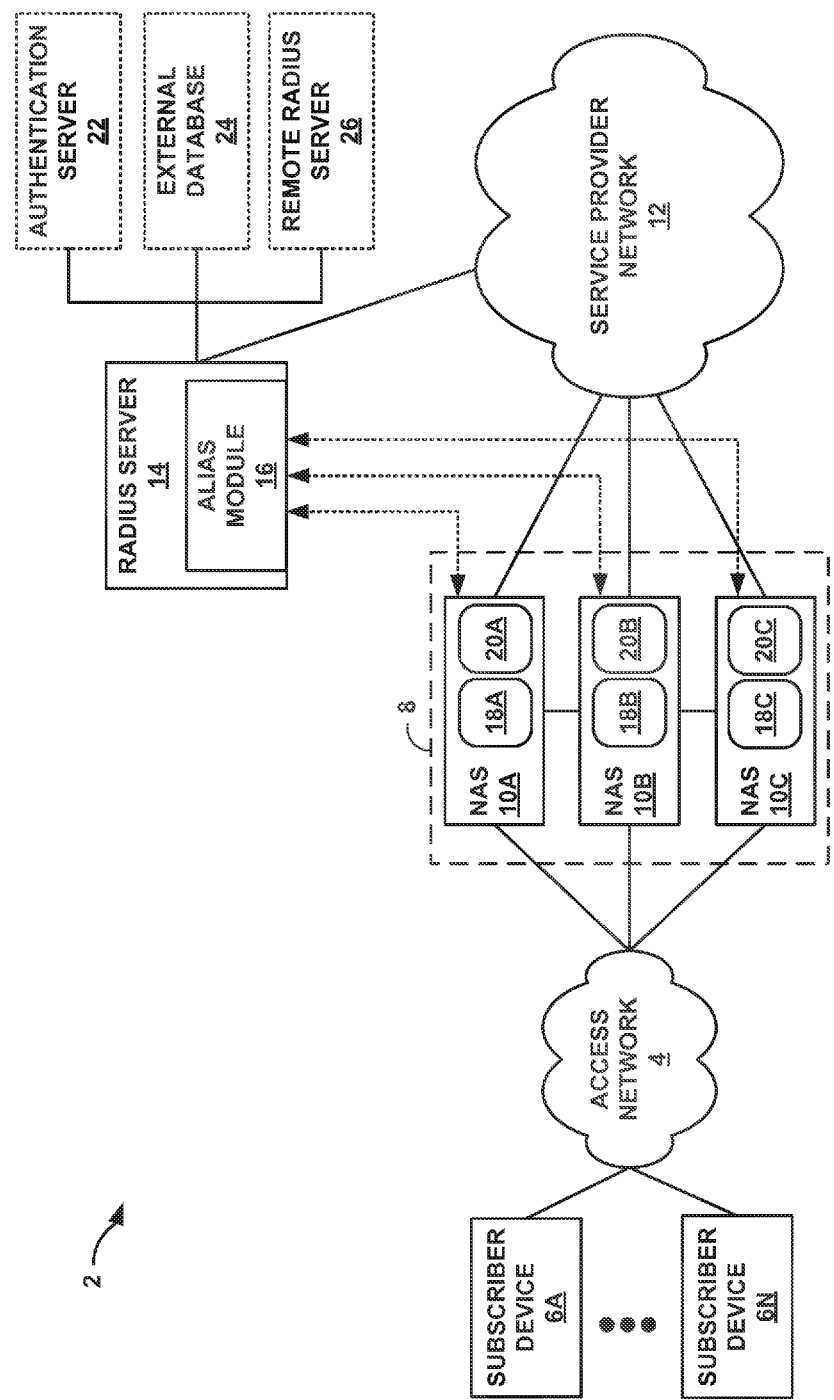
FIG. 1 is a block diagram illustrating a network system having a Remote Access Dial In User Service (RADIUS) server that supports redundant RADIUS AAA sessions in a clustered environment in conformity to techniques described in this disclosure.

FIG. 1 is a block diagram illustrating a network system having a Remote Access Dial in User Service (RADIUS) server that supports redundant RADIUS AAA sessions in a clustered environment in conformity to techniques described in this disclosure. In this example, network system 2 includes service provider (SP) network 12 coupled to access network 4 via network access servers (NASes) 10A-10C (collectively, "NASes 10").

Service provider network 12 supports one or more packet-based services that are available for request and use by subscriber devices 6A-6N (collectively, "subscriber devices 6"). As examples, SP network 12 may provide Internet access, bulk data delivery, voice over Internet protocol (VoIP), Internet Protocol television (IPTV), Short Messaging Service (SMS), Wireless Application Protocol (WAP) service, Telnet, or customer-specific application services. Service provider network 12 may include, for instance, a local area network (LAN), a wide area network (WAN), the Internet, a virtual LAN (VLAN), an enterprise LAN, a layer 3 virtual private network (VPN), an Internet Protocol (IP) intranet operated by a network service provider that also operates access network 4, an enterprise IP network, or some combination thereof. In various embodiments, SP network 12 may be connected to a public WAN, the Internet, or to other networks. SP network 12 executes one or more packet data protocols (PDPs), such as IP (IPv4 and/or IPv6), X.25 or Point-to-Point Protocol (PPP), to enable packet-based transport of SP network 12 services.

An administrator of SP network 12 (a network service provider) deploys a cluster of NASes 10 to function as one or more gateways to the service as provided by a service provider network. Accordingly, each of NASes 10 is a device or component (e.g., board or service card) within a device that provides access to SP network 12. For example, each of NASes 10 may represent and/or incorporate a network access server that provides dial-up or virtual private network (VPN) services to an enterprise LAN, a remote access server (e.g., broadband remote access server) or broadband services router that aggregates outputs from one or more Digital Subscriber Line Access Multiplexers (DSLAMs) into a higher-speed uplink to SP network 12, a wireless access point (WAP) providing wireless physical layer access to SP network 12, or switches that use other LAN-based (e.g., Ethernet) technologies to provide wired physical layer access to SP network 12. One or more of NASes 10 may include a plurality of service cards that implement a decentralized control plane for subscriber management. As described in further detail with respect to HG. 7, each of the service cards may implement distinct aspects of a network access server. Example network gateways having a decentralized control plane are described in U.S. patent application Ser. No. 13/248,825, entitled HIGH-AVAILABILITY MOBILE GATEWAYS HAVING INTERCHASSIS NON-UNIFORM SERVICE UNIT REDUNDANCY, filed Sep. 29, 2011, the entire contents of which being incorporated herein.

Subscriber devices 6 connect to NASes 10 via access network 4 to receive connectivity to SP network 12 services for applications hosted by subscriber devices 10, Each of subscriber devices 6 may represent, for example, a workstation, desktop computer, laptop computer, cellular or other mobile device, Personal Digital Assistant (PDA), gaming console, television set-top box, smart phone, tablet computer, or any other device capable of accessing a computer network via a wireless and/or wired connection. Each of subscriber devices 6 may be associated with a subscriber (e.g., a human). Applications that access services provided by SP network 12 may alternatively be referred to as "user agents." In this example, any of subscriber devices 6 may connect to any of NASes 10 in order to access SP network 12. Each of NASes 10 presents a different control plane IP address to upstream devices such as RADIUS server 14.

A network service provider (or other entity that administers SP network 12) operates or in some cases leases elements of access network 4 to provide packet transport between subscriber devices 6 and NASes 10. Access network 4 may include a broadband access network, cellular access network, a wireless LAN, a public switched telephone network (PSTN), or other type of access network. In examples of network system 2 that include a cellular access network as access network 4, any of NASes 10 may represent a mobile gateway, for example, a Gateway General Packet Radio Service (GPRS) Serving Node (GGSN), an Access Gateway (aGW), or a Packet Gateway (P-GW). Access network 4 may include a plurality of service virtual LANs (SVLANs) that partition elements of access network (e.g., DSLAMs) into logically different networks. Different subscriber devices 6 may therefore connect to NASes 10 using different SVLANs.

The elements of access network 4 may support any one or more of a variety of protocols, such as Internet Protocol (IP), Frame Relay, Asynchronous Transfer Mode (ATM), Ethernet, Point-to-Point Protocol (PPP), Point-to-Point Protocol over Ethernet (PPPoE), GPRS tunneling protocol (GTP), and virtual local area network (VLAN)-related protocols, among others. Using any one or more of these protocols, any of subscriber devices 10 may present authentication credentials to one or more of NASes 10 to request access to a SP network 12 service. For example, subscriber device 10A may broadcast credentials, such as username and password, to each of NASes 10 to request access to a service provided by SP network 12. Subscriber devices 10 may broadcast credentials using, for instance, a PPPoE Active Discovery Initiation (PADI) packet to each of NASes 10. In some instances, each of subscriber devices 10 is logically associated with one of NASes 10 and unicasts credentials directly to the associated NAS to request a service.

In the example, as shown in FIG. 1, NASes 10 may be configured by the network service provider (or other administrative entity) as an interchassis redundancy (ICR) cluster 8 to load balance and provide high-availability services to subscribers 6. In this example, ICR cluster 8 including NASes 10 is an active/active configuration such that each of NASes 10 concurrently, actively manages and enables connectivity to SP network 12 for a different subset of subscribers 6. A subset of subscribers 6 actively managed by one of NASes 10 (the active NAS for the subset) is referred to herein as a partition. In addition, each of NASes 10 also functions as a backup NAS for one or more partitions. For example, NAS 10A may operate as an active NAS for subscriber 10A and as a backup NAS for subscriber 10N. In other examples, NASes 10 may function in active/backup configurations.

The active NAS 10 for a partition establishes subscriber sessions for the set of subscribers 6 in the partition to enable connectivity to SP network 12. Each service provided by the active NAS 10 to a subscriber may constitute a session, with the beginning of the session defined as the moment when service is first provided and the end of the session defined as the moment when service is ended. A subscriber may have multiple sessions in parallel and/or in series. The active NAS 10 for the partition stores session context information for corresponding subscriber sessions to a corresponding one of active session contexts 18A-18C (collectively, "active session contexts 18") for the NAS. For example, NAS 10A stores subscriber session contexts for one or more partitions for which NAS 10A is an active NAS to active session contexts 18A.

Each of active session contexts 18 includes one or more subscriber session contexts for subscriber sessions actively managed by the active NAS 10. A subscriber session context in any of active session contexts 18 tier a subscriber session stores session context information, such as the IP address allocated to the subscriber, the Access Point Name (APN) for the service, a Network Service Access Point Identifier (NSAPI) for the service session, forwarding information, charging information for accounting records, one or more quality of service (QoS) profiles for the subscriber, and/or a subscriber IMSI or other mobile subscriber identity.

Using interchassis redundancy techniques, active NASes 10 for partitions recreate active session contexts 18 to backup sessions contexts 20A 20C (collectively, "backup session contexts 20") stored by one or more backup NASes 10 for the partitions. Each of backup session contexts 20 includes one or more subscriber session contexts replicated from active session contexts 18 for one or more partitions for which the corresponding NAS 10 functions as a backup NAS. Upon failure of an active NAS 10 for a partition, one of the backup NASes 10 for the partition assumes responsibility for managing subscriber sessions for the partition, in effect becoming the new active NAS 10 for the partition. NASes 10 may, for example, use Virtual Router Redundancy Protocol (VRRP) to detect failures.

NASes 10 are configured by the network service provider (or other administrative entity) as RADIUS clients to direct NASes 10 to outsource authentication, authorization, and accounting (AAA) functions to a specified RADIUS server 14, a device that receives and processes connection requests or accounting messages sent by any of NASes 10. Authentication is the process of verifying a subscriber identity. Authorization is the process of determining whether and the form in which an authenticated subscriber has access to SP network 12. Accounting is the process of generating records of session statistics for subscribers for billing and monitoring, for example.

When an active NAS 10 for a subscriber receives authentication credentials from the subscriber in an request to access SP network 12 services, the active NAS 10 sends a RADIUS protocol Access-Request to RADIUS server 14 containing attributes such as the subscriber user name and password, an identifier for the active NAS 10 (e.g., the "NAS-ID"), the active NAS 10 network address, and the Port ID the subscriber is accessing. If RADIUS server 14 includes a configuration record for the subscriber and the authorization credentials are correct, RADIUS server 14 returns a RADIUS protocol Access-Accept message to the active NAS 10. If a match is not found or a problem is found with the authentication credentials, the server returns an Access-Reject message. The active NAS 10 then establishes or terminates the user's connection. The active NAS 10 may then forward accounting information to RADIUS server 14 to document the transaction. RADIUS server 14 may store or forward this information to support billing for the services provided.

In some examples, RADIUS server 14 may outsource some AAA functionality to one or more backend servers, such as authentication server 22, external database 24, and remote RADIUS server 26. These backend servers are illustrated in FIG. 1 with dashed lines to indicate RADIUS server 14 may or may not, in various examples, use AAA services provided by the backend servers. Authentication server 22 is a backend authentication server, such as an RSA SecurID system, a Structured Query Language or Lightweight Directory Access Protocol (LDAP) database server, or Home Location Register, that stores is a list of subscriber accounts and subscriber account properties that can be checked by RADIUS server 14 to verify authentication credentials and queried by RADIUS server 14 to Obtain subscriber account properties containing authorization and connection parameter information for subscribers. In some cases, authentication server 22 verifies authentication credentials on behalf of RADIUS server 14. External database 24 is a backend database that RADIUS server 14 may use to store accounting information. In some cases, RADIUS server 14 is a proxy server for remote RADIUS server 26.

RADIUS server 14 stores (internally or using external database 24, for example) session information in session records for respective subscriber sessions established by NASes 10. Session records include information received from NASes 10 in RADIUS request messages, such as RADIUS Accounting-Request and/or Access-Request messages. For example, a session record for a session established by NAS 10A may include a subscriber user name, a NAS-Identifier value for that uniquely identifies NAS 10A to RADIUS server 14, a NAS 10A network address (e.g., an IPv4 or IPv6 address), an accounting session identifier that uniquely identifies the session on NAS 10A "Acct-Session-Id" described in RFC 2866), and accounting information (e.g., input or output octets/packets for the session, timing information).

In accordance with described techniques, RADIUS server 14 includes alias module 16 that associates NAS identifiers for NASes 10 with a single NAS identifier alias for ICR cluster 8. A NAS identifier for any of NASes 10 may refer to the NAS network address or the NAS-IDentifier value for the NAS. Alias module 16 interfaces with session records stored by RADIUS server 14 by mapping NAS identifiers received in RADIUS protocol messages received from any of NASes 10 of ICR cluster 8 to the NAS identifier alias. To add, retrieve/modify, or delete a session record for a session established by any of NASes 10 in response to a RADIUS request message, RADIUS server 14 uses a combination of the NAS identifier alias mapped by alias module 16 and an accounting session identifier also received in the RADIUS request message as a lookup key (or "index") for the session records. RADIUS server handles subsequent RADIUS requests messages associated with the session from any of NASes 10 by similarly aliasing the NAS identifiers included in the messages to the NAS identifier alias configured for ICR cluster 8.

In the event the active NAS 10 for the session fails, a standby one of NASes 10 for the session assumes responsibility for maintaining service connectivity for the session and uses one of backup session contexts 20 to continue the session. As a result, RADIUS server 14 receives subsequent requests or other messages associated with the session from the newly-active NAS 10 that has a NAS identifier that is distinct from the NAS identifier of the previous active NAS 10 for the session. By also aliasing the NAS identifier for the newly-active NAS 10 to the NAS identifier alias, RADIUS server 14 may use the combination of the NAS identifier alias and the accounting session identifier to look up the session record to access session information therein. As a result, the techniques may enable RADIUS server 14 to associate all subscribers 6 that attach to any NASes 10 of ICR cluster 8 with a single interface (the NAS identifier alias) while maintaining conformity to the RADIUS protocol described in RFC, 2865. On a NAS 10 failure, RADIUS server 14 may therefore avoid creating a new session record keyed to a combination of the NAS identifier for the newly-active NAS 10 and the accounting session identifier and instead maintain continuity for a session that was established by the previously active NAS 10.

Figure 2:
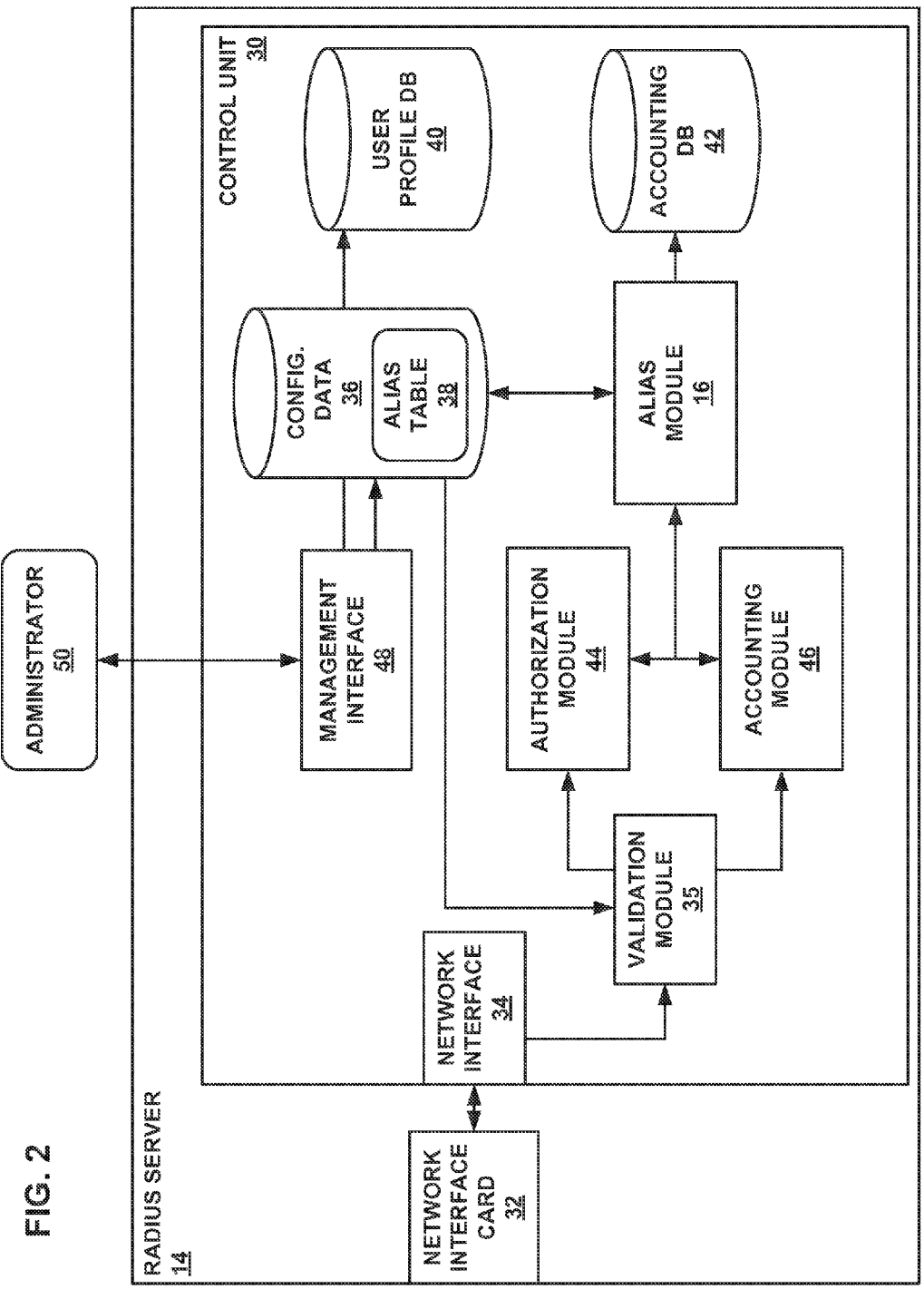
FIG. 2 illustrates, in detail, an example RADIUS server that supports redundant RADIUS AAA sessions in a clustered environment in accordance with techniques described in this disclosure.

FIG. 2 illustrates, in detail, an example RADIUS server that supports redundant RADIUS AAA sessions in a clustered environment in accordance with techniques described in this disclosure. RADIUS server 14 includes control unit 30 and network interface 32. Operation of RADIUS server 14 is described in the context of network system 2 of FIG. 1.

Control unit 30 of RADIUS server 14 provides an operating environment for executing modules, which in the illustrated example include alias module 16, network interface 34, authorization module 44, accounting module 46, and management interface 48. Control unit 30 may include one or more processors (not shown), including one or more microprocessors, digital signal processors (DSPs), application specific integrated circuits (ASICs), field programmable gate arrays (FPGAs), or any other equivalent integrated or discrete logic circuitry, as well as any combinations of such components, to execute modules that implement the functionality described herein. In this example, control unit 30 also includes computer-readable storage media to store configuration data 36, user profile database 40 (illustrated as "user profile DB 40"), and accounting database, 42 (illustrated as "accounting DB 42") data structures, which may include flat files, databases, tables, trees, and/or lists, for example.

Administrator 50 represents a network service provider entity (e.g., a human or software agent) that invokes management interface 48 to configure RADIUS server 14 with configuration data of configuration data 36 and user profiles of user profile database 40. Management interface 48 may present a front-end interface, such as an web-based or other graphical user interface or a command-line interface, to allow administrator 50 to enter configuration data. Management interface 48 may present an LDAP configuration interface for configuring and retrieving user profiles from user profile database 40. Management interface 48 may also execute Simple Network Management Protocol to enable monitoring and configuration by administrator 50.

Administrator 50 invokes management interface 48 to add RADIUS client information to configuration data 36 for each client of RADIUS server 14, such as each of NASes 10 of FIG. 1. RADIUS client information for any of NASes 10 may include the NAS network address and a RADIUS shared secret used to validate communications between RADIUS server 14 and the NAS. NASes 10 network addresses may be management addresses of different chassis that constitute an ICR cluster. In accordance with aliasing techniques described herein, management interface 48 presents an interface with which administrator 50 configures a NAS identifier alias for NASes 10. For example, the interface may present a list of configured NASes for RADIUS server 14 that allows administrator 50 to enter a NAS identifier alias and to mark NASes 10 to be aliased to the NAS identifier alias. As another example, the interface may include a configuration command that receives a list of NAS network addresses to be aliased and a NAS identifier alias as parameters. In some instances, the NAS identifier alias may be a NAS identifier for one of the aliased NASes 10 (e.g. a network address or a NAS-IDentifier value).

Management interface 48 stores aliasing information that associates NASes 10 with a single NAS identifier alias to alias table 38. For example, management interface 48 may associate multiple NAS identifiers corresponding to the multiple NASes with the single NAS identifier alias in alias table 38. In some examples, administrator 50 configures NASes 10 in RADIUS server 14 with common shared secrets that management interface 48 may also store to alias table 38. Alias table 38 represents an associative data structure, such as a table or dictionary (i.e., associative array). Administrator 50 may configure aliasing information for multiple different interchassis redundancy dusters.

User profile database 40 stores user profiles for subscribers. A user profile may include a corresponding subscriber user name and password and/or other authentication credentials, as well as the subscriber's authorization and/or connection parameters. In some examples, user profile database 40 is a remote database to which RADIUS server 14 issues authentication and authorization requests to receive an authentication indication (e.g., accept or reject) as well as authorization and/or connection parameters.

Accounting database 42 stores subscriber accounting information for RADIUS server 14 operating as a RADIUS accounting server. Accounting database 42 may include an SQL database. In some examples, accounting database 42 is a remote database to which RADIUS server 14 issues queries to add or modify subscriber accounting information.

Network interface card 32 exchanges network packets that carry RADIUS protocol messages with one or more NASes 10 connected to network interface card 32 by network links. Network interface card 32 exchanges network packets with network interface 34 of control unit 30. User Datagram Protocol (UDP) datagrams carry RADIUS protocol messages. Network interface 34 implements a network stack to receive UDP messages sent to a port assigned to RADIUS and provides application data in the form of RADIUS protocol request packets to authorization module 44 and accounting module 46 for processing after threshold validation of the RADIUS protocol messages by validation module 35. Similarly, network interface 34 uses the network stack to encapsulate RADIUS reply packets in UDP datagrams for output by network interface card 32 to NASes 10.

Example RADIUS protocol request packets include Access-Request messages sent by a RADIUS client to request authentication and authorization for a service connection and Accounting-Request messages sent by a RADIUS client to specify accounting information for a service connection that has been established by the RADIUS client. Network interface 34 provides each RADIUS protocol request packet to validation module 35, which performs RADIUS client validation of the packet by confirming that the request authenticator included therein specifies the shared secret configured in alias 38 for the source network address of the RADIUS protocol request message. If RADIUS client validation fails, the packet is silently ignored/dropped. Upon successful RADIUS client validation, validation module 35 passes the RADIUS protocol request message to authorization module 44 (in the case of an Access-Request message) or to accounting module 46 (in the case of an Accounting-Request message).

Authorization module 44 processes an Access-Request message from NAS 10A by querying user profile database 40 to obtain credentials for the subscriber requesting access and attempting to validate the subscriber against the credentials. If authorization fails, authorization module 44 returns an Access-Reject message to NAS 10A. If authorization is successful, authorization module 44 returns an Access-Accept message to the NAS 10A.

In addition to a subscriber user name and credentials, the Access-Request message includes one or more attributes. Specifically, the Access-Request message includes at least one network access server (NAS) identifier (e.g., a NAS-IDentifier value and/or a NAS-1P-Address value) for NAS 10A and may in some cases include an Acct-Session-Id, as well as other attributes. When the Access-Request message includes an Acct-Session-Id and authorization is successful, authorization module 44 may in some cases access a session record by creating the session record in accounting database 42 for the authorized session to be established by NAS 10A. In accordance with the described techniques, alias module 16 uses a NAS identifier in the Access-Request as a key to look up aliasing information in alias table 38 to determine whether NAS 10A that issued the Access-Request is aliased RADIUS server 14. If alias module 16 determines aliasing information is present in alias table 38 for the NAS identifier, alias module 16 directs authorization module 44 to create the session record in accounting database 42 for the authorized session using a combination of the Acct-Session-Id and the NAS identifier alias associated with the NAS identifier in alias table 38. In this way, authorization module 44 creates the session record such that the session may be identified based on a combination of the Acct-Session-Id and the NAS identifier alias for ICR cluster 8 that includes NAS 10A, rather than based on the Acct-Session-Id and the NAS identifier for NAS 10A itself (which may be different than the NAS identifier alias). Authorization module 44 thus groups session records for sessions established by any of NASes 10 that is a member of ICR cluster 8.

Like an Access-Request message, an Accounting-Request message issued by NAS 10A, for instance, and received by RADIUS server 14 must include at least one NAS identifier and must also include an Acct-Session-Id that uniquely identifies one of active sessions contexts 18A (and the corresponding session) of NAS 10A, as well as other attributes that carry accounting information for storage to accounting database 42. Alias module 16 uses a NAS identifier in the Accounting-Request as a key to look up aliasing information in alias table 38 to determine whether NAS 10A that issued the Accounting-Request is aliased in RADIUS server 14. If alias module 16 determines aliasing information is present in alias table 38 for the NAS identifier, alias module 16 directs accounting module 46 to access a session record to retrieve the session record in accounting database 42 for the session using a combination of the Acct-Session-Id and the NAS identifier alias associated with the NAS identifier in alias table 38. Accounting module 46 may then modify the session record using the accounting information carried by the Accounting-Request message. Modifying a session record using the accounting information may include adding a log entry to accounting database 42 that references the session record. Alias module 16 using aliasing information configured in alias table 38 may in this way enable accounting module 46 to look up session records tier any sessions established by any of NASes 10 of ICR cluster 8 aliased to the NAS identifier alias as though the sessions are established by a single network access server. As a result (continuing the above example), regardless of whether the session requested by a subscriber was originally established by NAS 10B, for example, but which NAS 10A subsequently assumed responsibility using the replicated session context in backup session contexts 20A for the session, the techniques enable RADIUS server 14 to create, retrieve, modify, and delete a session record in accounting database 42 upon receiving Accounting-Request messages from NAS 10A that include the Acct-Session-Id for the session. RADIUS server 14 need not therefore create new session records as NASes 10 fail and session management migrates to backup NASes. Moreover, the techniques permit RADIUS server 14 to alias NASes 10 to a NAS identifier and comply with the requirement set forth in RFC 2865 and RFC 2866 that RADIUS servers identify sessions using a combination of a NAS identifier and an Acct-Session-Id.

Figure 3:
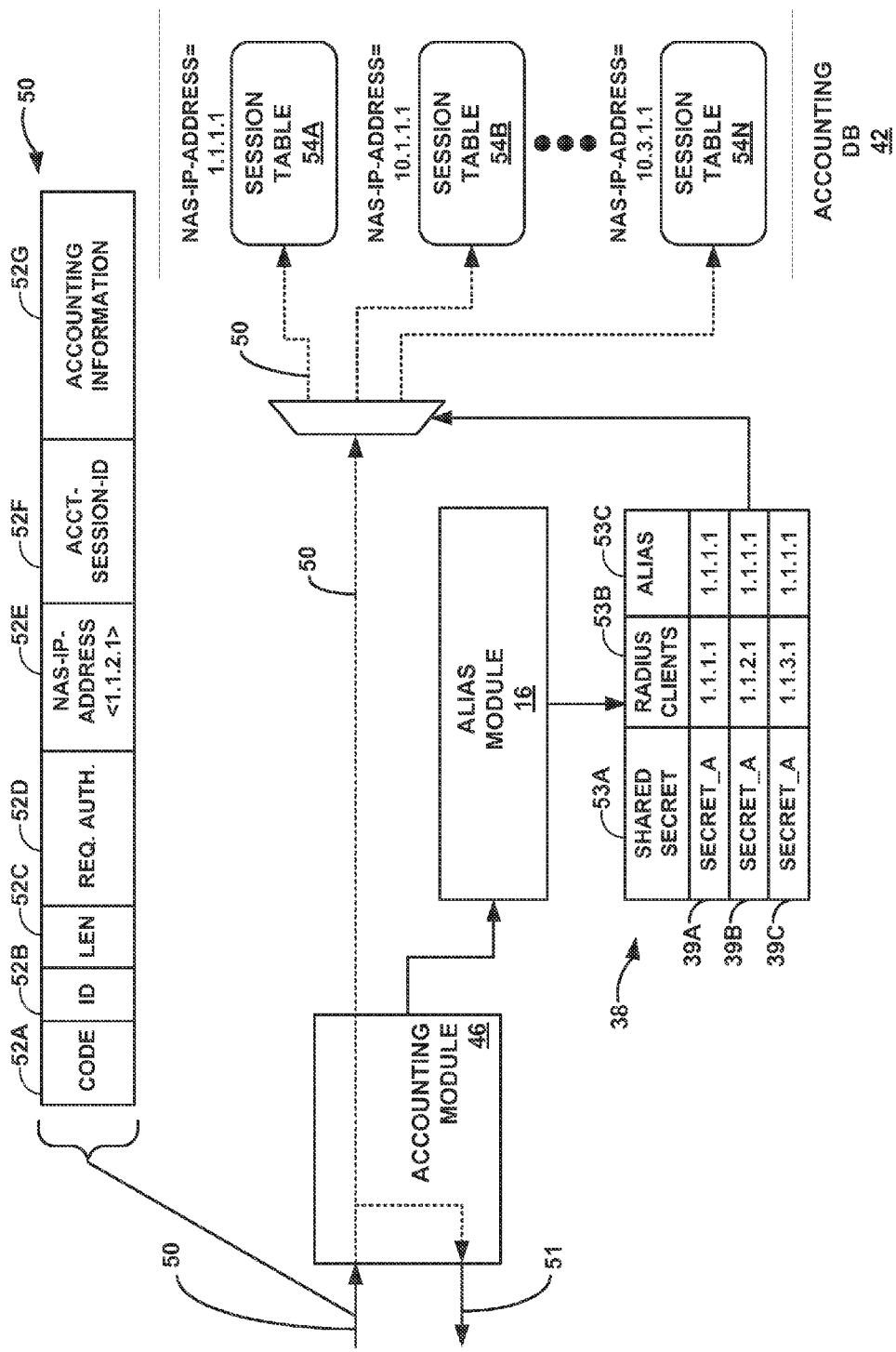
FIG. 3 is a block diagram illustrating example data structures.

FIG. 3 is a block diagram illustrating example data structures. The illustrated example components of RADIUS server 14 of FIG. 2 use a NAS network address as a NAS identifier for session record creation lookup. Alias table 38 stores aliasing information for NASes 10 that includes values for shared secret field 53A, RADIUS client field 5313, and alias field 53C. Alias table entries 39A-39C for respective NASes 10A-10C of FIG. 1 each specifies a common shared secret SECRET_A and also each specifies a NAS identifier alias of 1.1.1.1 in alias field 53C that shared a value with the NAS identifier of NAS 10A. Alias table entries 39A-39C list associate NAS identifiers for NASes 10A-10C with the NAS identifier value in alias field 53C.

Accounting database 42 includes session tables 54A-54N (collectively, "session tables 54") that each stores zero or more session records for different RADIUS clients of RADIUS server 14. Each of session tables 54 is associated in accounting database 42 with a different NAS identifier for a RADIUS client, which in this case is a different NAS-IP-Address attribute value for the RADIUS client. For example, session table 54A stores session records for NAS-IP-Address 1.1.1.1, the NAS identifier alias for ICR cluster 8 specified in alias table 38. As another example, session table 549 stores session records for NAS-IP-Address 10.1.1.1, which may represent a NAS identifier alias for another ICR cluster of RADIUS clients or a RADIUS client. While illustrated as different tables, session tables 54 may be stored as a single table data structure with column that specifies NAD identifier values for table records to associate different RADIUS clients with logically different session tables 54.

Accounting module 46 receives Accounting-Request message 50 having at least illustrated fields 52A-52G. Code field 52A identifies the type of RADIUS packet (in this case an Accounting-Request), Identifier field 52B aids in matching Accounting-Requests to corresponding Accounting-Replies. Length field 52C indicates the length of Accounting-Request message 50. Request authentication field 52D authenticates messages between the issuing RADIUS client and RADIUS server 14 using a shared secret known to both entities. The issuing RADIUS client may be any of NASes 10 of FIG. 1, for instance.

Fields 52E-52G specify different attributes for Accounting-Request message 50. NAS-IP-Address field 52E includes the IP address 1.1.2.1 for the issuing RADIUS client, Acct-Session-Id uniquely identifies a session context (and corresponding session), for instance one of active sessions 18, on the issuing RADIUS client. Accounting information 52G includes additional attributes for Accounting-Request message 50 (e.g., Acct-Input-Octets, Acct-Output-Octets, and Acct-Session-Time).

Accounting module 46 authenticates Accounting-Request message 50 using the value in Request Authenticator field 52D and the shared secret 53A in alias table 38 for NAS-IP-Address 52E. Alias module 16 then keys a NAS identifier for Account-Request message 50, in this case NAS-IP-Address 52E having value 1.1.2.1 to identify alias table entry 39B that specifies NAS identifier alias 1.1.1.1. Accounting module 46 uses the NAS identifier alias to look up Acct-Session-Id in session table 54A that is associated with NAS-IP-Address 1.1.1.1 and insert or update a session record using attributes in accounting information 52G. Accounting module 46 may then issue an Accounting-Response message 51 to the issuing RADIUS client.

Figure 4:
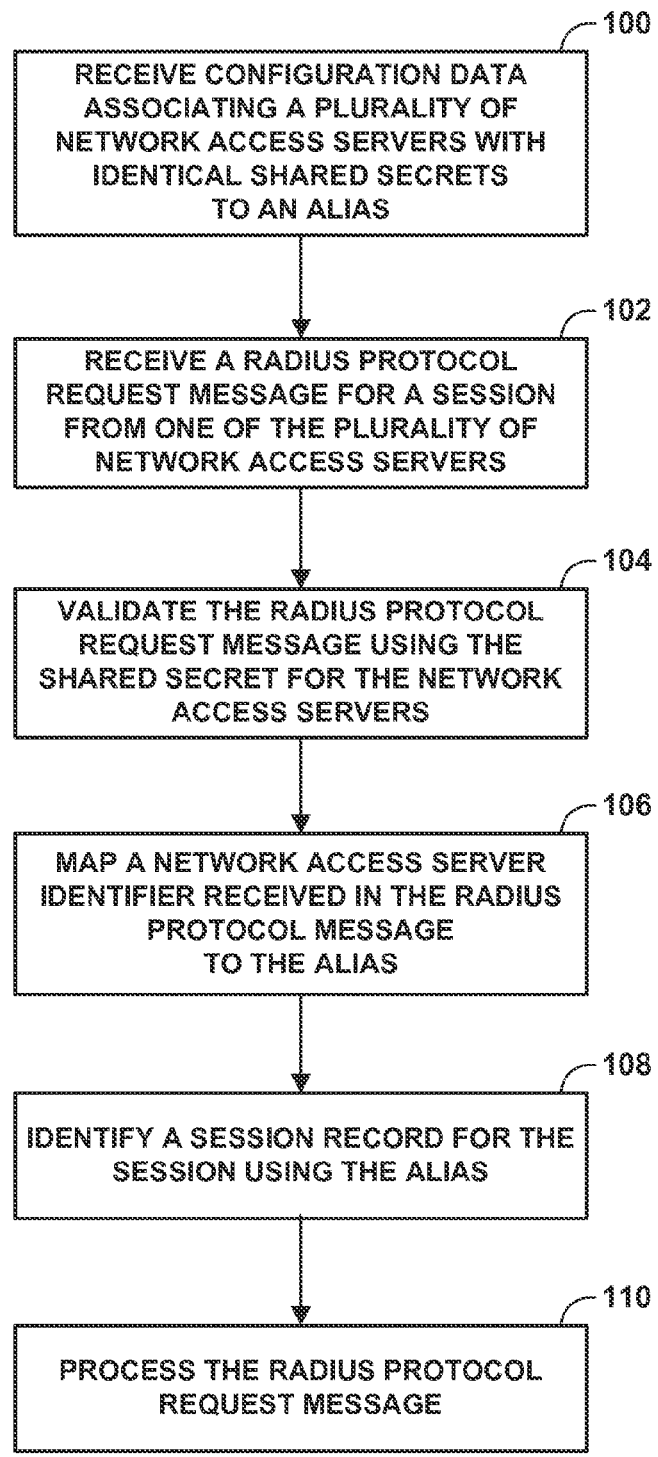
FIG. 4 is a flowchart illustrating an example mode of operation for a RADIUS server that supports redundant AAA sessions in a clustered environment.

FIG. 4 is a flowchart illustrating an example mode of operation for a RADIUS server that supports redundant AAA sessions in a clustered environment. The example mode of operation is described with respect to RADIUS server 16 of FIG. 2.

Management interface 48 receives configuration data that includes abasing information associating NASes 10 to a single NAS identifier alias as well as a common shared secret for each of NASes 10 (100). Management interface stores the aliasing information to alias table 38. Network interface 34 receives a RADIUS protocol request message, such as an Accounting-Request, for a session from one of NASes (102). Validation module 35 validates the RADIUS protocol request message using the request authenticator and the shared secret for NASes 10 stored to alias table 38 and passes the RADIUS protocol request message to accounting module 46 in the case of a RADIUS Accounting-Request message (or to authorization module 44 in the case of a RADIUS Access-Request) (104).

Alias module 16 maps a NAS identifier received in the RADIUS protocol request message to the NAS identifier alias for NASes 10 based at least on the configuration data stored to alias table 38 (106). Using the NAS identifier alias, accounting module 46 (or authorization module 44) identifies (or creates) a session record in accounting database 42 for the session referenced in the RADIUS protocol request message (108) and processes the RADIUS protocol request message to modify (or create) the identified session record using attributes included in the RADIUS protocol request message (110).

Figure 5:
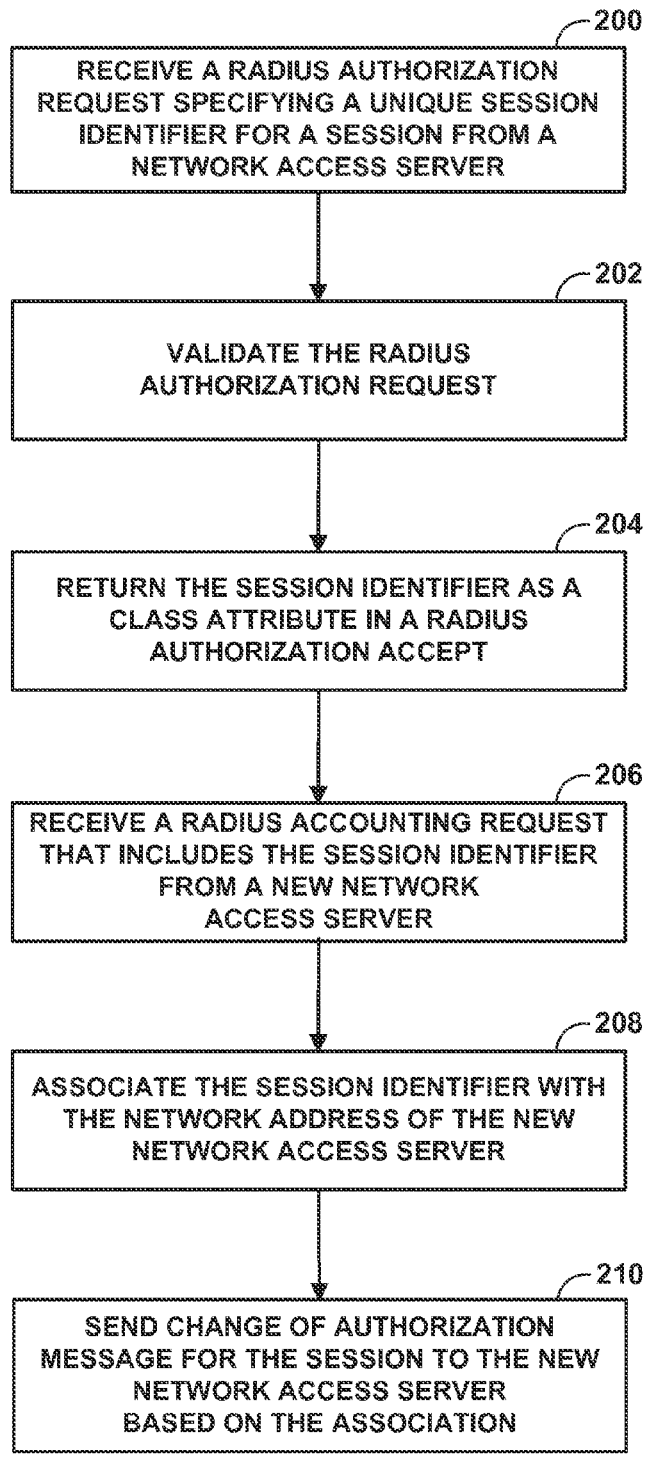
FIG. 5 is a flowchart illustrating an example mode of operation of a RADIUS server to send a RADIUS protocol Change of Authorization (CoA) request for a session to the RADIUS client having an active session context for the session in accordance with techniques described herein.

FIG. 5 is a flowchart illustrating an example mode of operation of a RADIUS server to send a RADIUS protocol Change of Authorization (CoA) request for a session to the RADIUS client having an active session context for the session in accordance with techniques described herein. The example mode of operation is described with respect to RADIUS server 16 of FIG. 2 operating in the context of network system 2 of FIG. 1.

In some cases, authorization module 44 may send a RADIUS server-initiated Change of Authorization (CoA) request to a NAS to direct the NAS to modify the session operation. Change of Authorization requests are described in Murtaza Chiba et al., "Dynamic Authorization Extensions to Remote Authentication Dial In User Service (RADIUS)," Network Working Group of the IETF, Request for Comments 3576, July 2003, which is incorporated by reference herein in its entirety.

Authorization module 44 receives, from one of NASes 10, a RADIUS Authorization-Request message that includes authorization credentials that specify a unique session identifier for a session to be established by the issuing NAS 10 (200). The unique session identifier may represent, for example, an IMSI or a combination of an IMSI and an NSAPI of the session.

After validating the RADIUS Authorization-Request message against user profile database 40 using the subscriber credentials (202), authorization module 44 returns a RADIUS Authorization-Accept message that includes a Class attribute set to the value of the unique session identifier (204). In accordance with RFC 2865, NASes 10 (whether the issuing NAS 10 and/or backup NASes 10 that assumes responsibility for the session) thereafter include a Class attribute set to the value of the unique session identifier in RADIUS Accounting-Request messages for the session.

Accounting module 46 receives a subsequent RADIUS Accounting-Request message that includes a Class attribute set to the value of the unique session identifier and that has been issued by a new one of NASes 10 that is different than the NAS 10 that issued the original RADIUS Authorization-Request message (206). The subsequent RADIUS Accounting-Request message may be an Interim-Update message that includes an accounting information update. Accounting module 46 associates a network address for the new NAS 10 with the unique session identifier (208). In some examples, accounting module 46 may store associations of network access servers with unique session identifiers to accounting database 42. In some examples, accounting module 46 uses a separate associate data structure to associate network access servers with unique session identifiers. Subsequently, authorization module 44 may identify the one of NAS 10 currently operating the session based on the association and send a CoA request for the session to the identified NAS 10 (210). For example, authorization module 44 may retrieve the unique session identifier from a session record for the session in accounting database 42 and then identify the NAS 10 currently operating the session based the association with the unique session identifier. In this way, RADIUS server 16 may send a CoA request for a session to the NAS 10 currently operating the session despite the responsibility for the session migrating among NASes 10 due to failover in accordance with interchassis redundancy.

Figure 6:
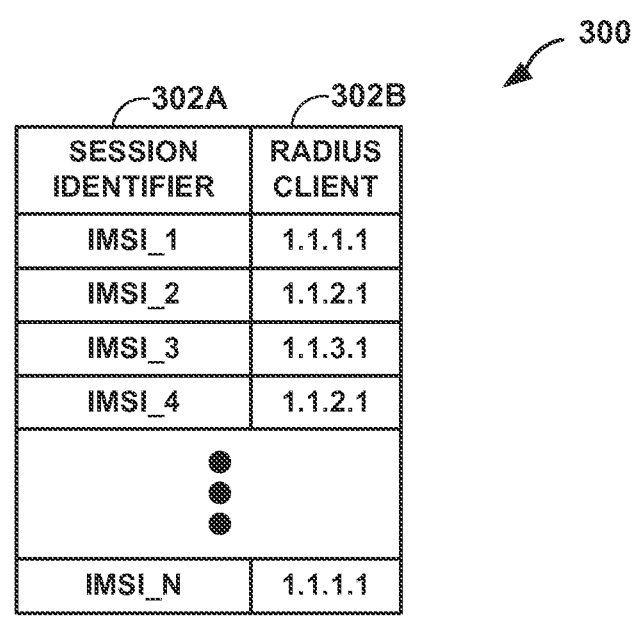
FIG. 6 is a block diagram illustrating a lookup table that associates unique session identifiers for session to respective RADIUS clients currently operating the sessions.

FIG. 6 is a block diagram illustrating a lookup table that associates unique session identifiers for session to respective RADIUS clients currently operating the sessions. Lookup table 300 may be distinct table stored to accounting database 42 or other storage structure of RADIUS 16 of FIG. 2, for example. Session identifier field 302A for each of lookup table 300 entries includes a value unique identifying a session. RADIUS client field 302B for each of lookup table 300 entries specifies a network address for a RADIUS client that currently operates the corresponding session. To send a RADIUS server-initiated message to the RADIUS client operating a session, authorization module 44 retrieves a session identifier from a session record in accounting database 42 for the session and keys the session identifier to session identifier field 302A in lookup table 300 to identify the associated RADIUS client specified in RADIUS client field 302B. Authorization module then sends the RADIUS server-initiated message to the identified RADIUS client.

Figure 7:
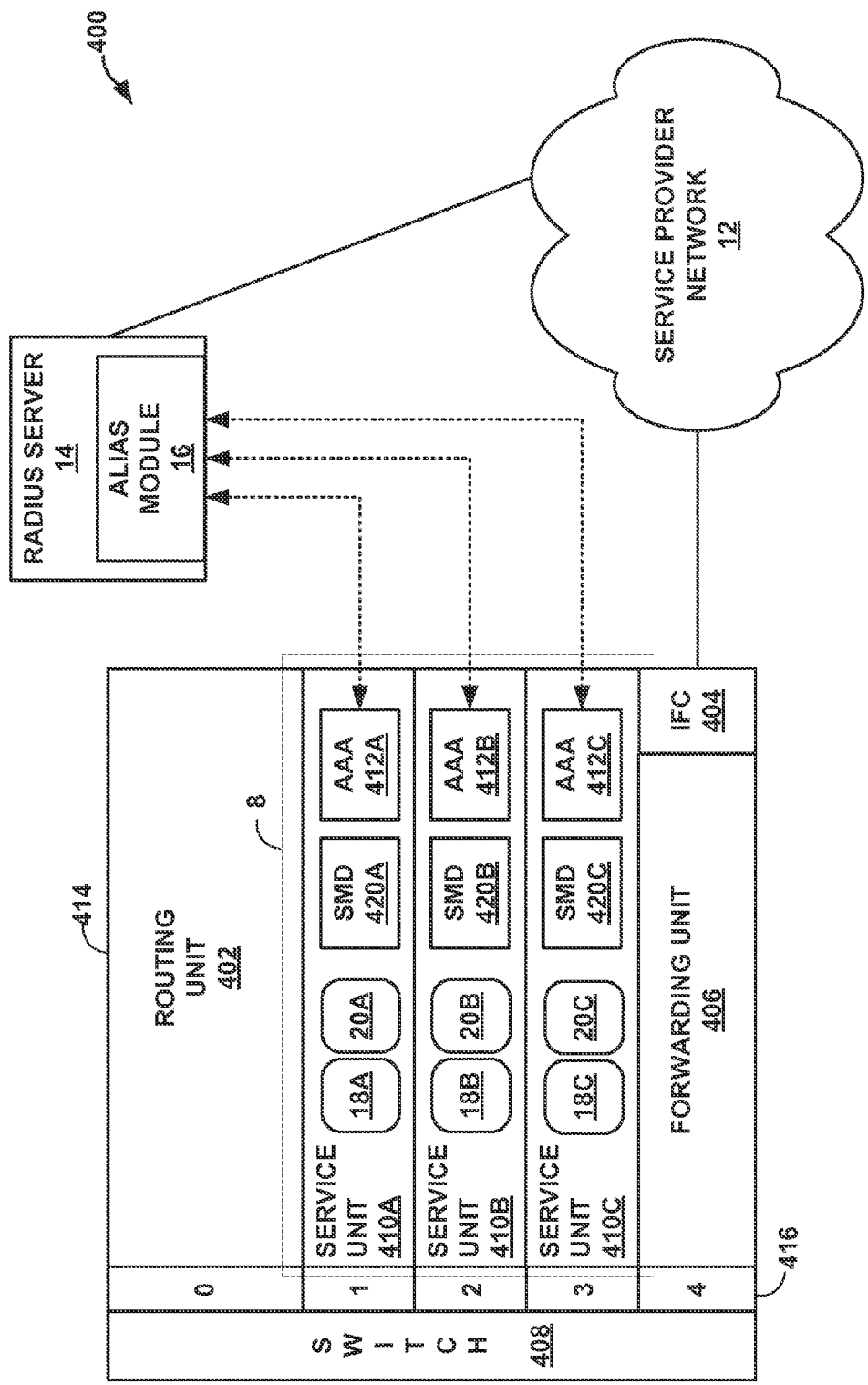
FIG. 7 is a block diagram illustrating a detailed example embodiment of an intrachassis redundancy group that includes multiple network access servers that communicate with a RADIUS server according to techniques described herein.

FIG. 7 is a block diagram illustrating a detailed example embodiment of an intrachassis redundancy group that includes multiple network access servers that communicate with a RADIUS server according to techniques described herein. Network system 400 may represent an example instance of network system 2 of FIG. 1.

In this example, network access server 414 ("NAS 414") includes a decentralized control plane in that control plane functionality is distributed among routing unit 402 and a plurality of service units 410A-410C (collectively, "service units 410"). NAS 414 also includes a forwarding unit 406 having a interface card 404 having a communication link to SP network 12 with which NAS 414 exchanges network traffic. In this example, service units 410A-410C may represent respective NASes 10A-10C that in this case implement intrachassis redundancy to provide failsafe network access server operation for NAS 414.

Each of routing unit 402, service units 410, and forwarding unit 406 may include one or more processors not shown in FIG. 7) that execute software instructions, such as those used to define a software or computer program, stored to a computer-readable storage medium (again, not shown in FIG. 7), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, each of routing unit 402, service units 410, and forwarding unit 406 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

NAS 414 includes a number of slots 416 communicatively coupled by switch 408. Each of slots 416 include connectors that engage components inserted therein and provide a physical interface to switch 408. In this way, switch 408 therefore couples routing unit 402, service units 410, and forwarding unit 406 to deliver data units and control messages among the units. Switch 408 may represent an internal switch fabric or cross-bar, bus, or link. Examples of high-speed multi-stage switch fabrics used as a data plane to relay packets between units within a router are described in U.S. Patent Application 2008/0044181, entitled MULTI-CHASSIS ROUTER WITH MULTIPLEXED OPTICAL INTERCONNECTS. The entire contents of U.S. Patent Application 2008/0044181 are incorporated herein by reference.

Forwarding units 406 that provides high-speed forwarding of network traffic received by interface card 404 ("IFC 404") via inbound links toward outbound links (with the exception of interchassis link 13, links not shown for ease of illustration) and delivery of inbound network traffic to any of service units 410 or routing unit 402. In general, service units 410 manage subscriber sessions in the control plane and thus receive and process control packets associated with subscriber sessions. Further details of packet processing and forwarding by examples of forwarding unit 406 is described in U.S. patent application Ser. No. 13/248,834, entitled "MOBILE GATEWAY HAVING REDUCED FORWARDING STATE FOR ANCHORING MOBILE SUBSCRIBERS," the entire content of which is incorporated by reference.

Forwarding unit 406 may include one or more packet forwarding engines ("PFEs") coupled to respective IFC 404 and may each represent, for example, a dense port concentrator (DPC), modular port concentrator (MPC), flexible physical interface card (PIC) concentrator (FPC), or another line card, for example, that is inserted into one of slots 416 of NAS 414. Routing unit 402 of the decentralized control plane executes the routing functionality of NAS 414. In this respect, routing unit 402 represents hardware or a combination of hardware and software of control that implements, with a routing protocol daemon, routing protocols by which routing information may be exchanged with other routers. Routing unit 402 may resolve the topology defined by the routing information to select or determine one or more routes through the network. Routing unit 402 may then update forwarding units 406 with these routes. Further details of one example embodiment of a router can be found in U.S. patent application Ser. No.

12/182,619, filed Jul. 30, 2008, entitled "STREAMLINED PACKET FORWARDING USING DYNAMIC FILTERS FOR ROUTING AND SECURITY IN A SHARED FORWARDING PLANE," which is incorporated herein by reference.

Service units 410 of the decentralized control plane of RAS 414 provide decentralized subscriber session setup and management for NAS 414. Each of service units 410 has a different network address with which to source and receive UDP datagrams to/from RADIUS server 14. Internally, each of service units 410 may include a unique identifier that identifies the service unit to other components of NAS 414. Service units 410 identifiers may include, for example, an index, slot number for corresponding one of slots 416, identifying string, internal IF address, or link layer address. Service units 410 may each represent, for example, a packet forwarding engine (PEE) or other component of a physical interface card insertable within NAS 414. The physical interface card may be, for instance, a multi-services dense port concentrator (MS-DPC). One or more of service units 410 may also each represent a co-processor executing on a routing node, such as routing unit 402. Service units 410 may be alternatively referred to as "service PIC," "session PICs", "service cards," or "session cards." Each of service units 410 includes substantially similar components to perform substantially similar functionality. For example, service units 410 each include a corresponding one of session management daemons 420A-420C (collectively, "SMDs 420").

Session management daemons 420 establish subscriber sessions requested by an access network serviced by NAS 414 and manage the sessions once established. SMDs 420 manage respective active sessions for active session contexts 20 and maintain respective backup session contexts 18. For example, SMD 420A manages active sessions for active session contexts 20A and communicates backup session context information with SMDs 420B, 420C to maintain backup session contexts 18A for active session contexts 20B and/or active session contexts 20C. Each of service units 410 includes an instance of an SMD 420 and may therefore independently execute control plane protocols required to establish a requested session for a subscriber, including the RADIUS protocol executed by AAA modules 412A 412C (collectively, "AAA modules 412" and illustrated as "AAA 412") of respective service units 410. In this sense, service units 410 provide a form of a decentralized control plane for managing subscriber communication sessions. As a result, NAS 414 may achieve increased scalability to handle thousands or millions of concurrent communication sessions for subscriber devices.

AAA modules 412 exchange RADIUS protocol messages with RADIUS server 14 using respective control plane network addresses of respective service units 410. Each of service units 410 may therefore represent one of NASes 10 of FIG. 1 arranged, however, in an intrachassis redundancy scheme rather than an interchassis redundancy scheme. Intrachassis redundancy and interchassis redundancy schemes may be combined.

Alias module 16 of RADIUS server 14 associates NAS identifiers for service units 410 with a single NAS identifier alias for NAS 414. A NAS identifier for any of service units 410 may refer to the service unit control plane network address or the NAS-IDentifier value for the service unit. Alias module 16 interfaces with session records stored by RADIUS server 14 by mapping NAS identifiers received in RADIUS protocol messages received from any of service units 410 of NAS 414 to the NAS identifier alias. To add, retrieve/modify, or delete a session record for a session established by any of service units 410 in response to a RADIUS request message, RADIUS server 14 uses a combination of the NAS identifier alias mapped by alias module 16 and an accounting session identifier also received in the RADIUS request message as a lookup key (or "index") for the session records. RADIUS server handles subsequent RADIUS requests messages associated with the session from any of service units 410 by similarly aliasing the NAS identifiers included in the messages to the NAS identifier alias configured for NAS 414.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:
1. A method comprising:
storing, with a Remote Authentication Dial-In User Service (RADIUS) server for a service provider network, aliasing information that associates a plurality of redundant network access servers with a common network access server identifier alias;

receiving, with the RADIUS server, a RADIUS protocol request message from a first network access server of the plurality of redundant network access servers for a session that enables connectivity between a subscriber and the service provider network;

associating, with the RADIUS server, the RADIUS protocol request message with the network access server identifier alias based at least on the aliasing information; and accessing, with the RADIUS server, a session record for the session using the network access server identifier alias.

2. The method of claim 1,
wherein the first network access server has a first network access server identifier that uniquely identifies the first network access server to the RADIUS server and that is different than the network access server identifier alias,
wherein the RADIUS protocol request message includes first network access server identifier, and
wherein associating the RADIUS protocol request message with the network access server identifier alias comprises mapping the first network access server identifier to the network access server identifier alias using the aliasing information.

3. The method of claim 1, wherein the aliasing information includes a common shared secret for each of the redundant network access servers, the method further comprising:
authenticating the RADIUS protocol request message using the common shared secret.

4. The method of claim 1, wherein the aliasing information associates respective network access server identifiers for the redundant network access servers with the network access server identifier alias.

5. The method of claim 4, wherein each of the network access service identifiers comprises one of a network access server network address or a Network Access Server-Identifier value.

6. The method of claim 1, wherein the RADIUS protocol request message comprises a RADIUS Authorization-Request that includes credentials for a subscriber requesting the session and an accounting session identifier, the method further comprising:
authenticating, with the RADIUS server, the subscriber using the credentials; and
creating, with the RADIUS server, a session record for the session that is uniquely identifiable within the RADIUS server by a combination of the network access server identifier alias and the accounting session identifier.

7. The method of claim 1, wherein the RADIUS protocol request message comprises a RADIUS Authorization-Request that includes an accounting session identifier and accounting information, the method further comprising:
accessing, with the RADIUS server, a session record for the session that is uniquely identifiable within the RADIUS server by a combination of the network access server identifier alias and the accounting session identifier; and
modifying the session record with the accounting information.

8. The method of claim 1, further comprising:
presenting a graphical user interface to an administrator that enables the administrator to select the redundant network access servers and enter a network access server identifier alias; and
receiving the aliasing information by the graphical user interface.

9. The method of claim 1, further comprising:
receiving, with the RADIUS server, a RADIUS protocol authentication request message that includes a unique session identifier from the first network access server; and
sending a RADIUS protocol authentication accept message that includes a Class attribute set to the unique session identifier from the RADIUS server to the first network access server.

10. The method of claim 9, further comprising:
in response to failure of the first network access server, receiving, with the RADIUS server, a RADIUS protocol accounting request message from a second network access server of the plurality of redundant network access servers, wherein the RADIUS protocol accounting request includes a Class attribute set to the unique session identifier;
associating, with the RADIUS server, the unique session identifier with a network address of the second network access server; and
based at least on the association, sending a Change of Authorization request from the RADIUS server to the second network access server rather than to the first network access server that issued the RADIUS protocol authentication request.

11. The method of claim 10, further comprising:
storing the unique session identifier to the session record for the session;
accessing the session record thr the session to retrieve the unique session identifier; and
mapping the unique session identifier to the network address of the second network access server using the association,
wherein sending the Change of Authorization request from the RADIUS server to the second network access server comprises sending the Change of Authorization request from the RADIUS server to the network address of the second network access server.

12. The method of claim 1,
wherein the session is a first session,
wherein the subscriber is a first subscriber, and
wherein the RADIUS protocol request message is a first RADIUS protocol request message, the method further comprising:
receiving, with the RADIUS server, a second RADIUS protocol request message from a second network access server of the plurality of redundant network access servers for a second session that enables connectivity between a second subscriber and the service provider network;
associating, with the RADIUS server, the second RADIUS protocol request message with the network access server identifier alias based at least on the aliasing information; and
accessing, with the RADIUS server, a session record for the second session using the network access server identifier alias.

13. A server that provides authentication, authorization, and accounting services for a service provider network, the server comprising:
a control unit having one or more processors;
an alias table to store aliasing information that associates a plurality of redundant network access servers with a common network access server identifier alias;
a network interface to receive a Remote Authentication Dial-In User Service (RADIUS) protocol request message from a first network access server of the plurality of redundant network access servers for a session that enables connectivity between a subscriber and the service provider network;

an alias module to associate the RADIUS protocol request message with the network access server identifier alias based at least on the aliasing information, wherein the control unit accesses a session record for the session using the network access server identifier alias.

14. The server of claim 13,
wherein the RADIUS protocol request message includes a first network access server identifier that uniquely identifies the first network access server and that is different than the network access server identifier alias, and wherein the alias module associates the RADIUS protocol request message with the network access server identifier alias by mapping the first network access server identifier to the network access server identifier alias using the aliasing information.

15. The server of claim 13,
wherein the aliasing information includes a common shared secret for each of the redundant network access servers, wherein the control unit authenticates the RADIUS protocol request message using the common shared secret.

16. The server of claim 13,
wherein the aliasing information associates respective network access server identifiers for the redundant network access servers with the network access server identifier alias.

17. The server of claim 13,
wherein each of the network access service identifiers comprises one of a work access server network address or a Network Access Server-Identifier value.

18. The server of claim 13, wherein the RADIUS protocol request message comprises a RADIUS Authorization-Request that includes credentials for a subscriber requesting the session and an accounting session identifier, the server further comprising:

an authentication module to authenticate the subscriber using the credentials, wherein the authentication module creates a session record for the session that is uniquely identifiable within the server by a combination of the network access server identifier alias and the accounting session identifier.

19. The server of claim 13,
wherein the RADIUS protocol request message comprises a RADIUS Authorization-Request that includes an accounting session identifier and accounting information, the server further comprising:

an accounting module to access a session record for the session that is uniquely identifiable within the server by a combination of the network access server identifier alias and the accounting session identifier, wherein the accounting module modifies the session record with the accounting information.

20. The server of claim 13, further comprising:
a management interface to present a graphical user interface to an administrator that enables the administrator to select the redundant network access servers and enter a network access server identifier alias, wherein management interface receives the aliasing information by the graphical user interface and stores the aliasing information to the alias table.

21. The server of claim 20, wherein the network interface receives a RADIUS protocol authentication request message that includes a unique session identifier from the first network access server, the server further comprising:

an authentication module that sends a RADIUS protocol authentication accept message that includes a Class attribute set to the unique session identifier from the server to the first network access server.

22. The server of claim 21, further comprising:
an accounting module to, in response to failure of the first network access server, receive a RADIUS protocol accounting request message from a second network access server of the plurality of redundant network access servers, wherein the RADIUS protocol accounting request includes a Class attribute set to the unique session identifier;

an accounting module to associate the unique session identifier with a network address of the second network access server, wherein, based at least on the association, the accounting module sends a Change of Authorization request from the server to the second network access server rather than to the first network access server that issued the RADIUS protocol authentication request.

23. The server of claim 22,
wherein the authentication module stores the unique session identifier to the session record for the session, wherein the accounting module accesses the session record for the session to retrieve the unique session identifier, wherein the accounting module maps the unique session identifier to the network address of the second network access server using the association, wherein the accounting module sends the Change of Authorization request from the server to the second network access server by sending the Change of Authorization request from the RADIUS server to the network address of the second network access server.

24. The server of claim 13,
wherein the session is a first session,
wherein the subscriber is a first subscriber, and
wherein the RADIUS protocol request message is a first RADIUS protocol request message, wherein the network interface receives a second RADIUS protocol request message from a second network access server of the plurality of redundant network access servers for a second session that enables connectivity between a second subscriber and the service provider network, wherein the alias module associates the second RADIUS protocol request message with the network access server identifier alias based at least on the aliasing information, and wherein the control unit accesses a session record for the second session using the network access server identifier alias.

25. A non-transitory computer-readable medium comprising instructions for causing one or more programmable processors to:

store, with a Remote Authentication Dial-In User Service (RADIUS) server for a service provider network, aliasing information that associates a plurality of redundant network access servers with a common network access server identifier alias;

receive, with the RADIUS server, a RADIUS protocol request message from a first network access server of the plurality of redundant network access servers for a session that enables connectivity between a subscriber and the service provider network;

associate, with the RADIUS server, the RADIUS protocol request message with the network access server identifier alias based at least on the aliasing information; and access, with the RADIUS server, a session record for the session using the network access server identifier alias.

* * * * *